United States Patent
Huang

(10) Patent No.: US 12,400,491 B2
(45) Date of Patent: Aug. 26, 2025

(54) VEHICLE FAULT PROCESSING METHOD AND APPARATUS, SERVER, DEVICE, AND MEDIUM

(71) Applicant: Black Sesame Technologies Co., Ltd., Wuhan (CN)

(72) Inventor: Shengjun Huang, Shenzhen (CN)

(73) Assignee: Black Sesame Technologies Co., Ltd. (CN)

( * ) Notice: Subject to any disclaimer, the term of this patent is extended or adjusted under 35 U.S.C. 154(b) by 58 days.

(21) Appl. No.: 18/355,315

(22) Filed: Jul. 19, 2023

(65) Prior Publication Data
US 2024/0029480 A1    Jan. 25, 2024

(30) Foreign Application Priority Data

Jul. 19, 2022 (CN) .......................... 202210848221.9

(51) Int. Cl.
G07C 5/00 (2006.01)
G07C 5/08 (2006.01)
H04L 67/12 (2022.01)

(52) U.S. Cl.
CPC ........... *G07C 5/008* (2013.01); *G07C 5/0808* (2013.01); *H04L 67/12* (2013.01)

(58) Field of Classification Search
CPC ........ G07C 5/008; G07C 5/0808; H04L 67/12
USPC ....................................................... 340/989
See application file for complete search history.

(56) References Cited

U.S. PATENT DOCUMENTS

| | | | | |
|---|---|---|---|---|
| 10,682,982 B2 * | 6/2020 | Sakuma | ................. | B60R 25/305 |
| 11,529,975 B2 * | 12/2022 | Li | ................. | G08G 1/202 |
| 2014/0043159 A1 * | 2/2014 | Inagaki | ................. | G08B 23/00 340/540 |
| 2016/0099927 A1 * | 4/2016 | Oz | ................. | G07C 5/0808 726/9 |

(Continued)

FOREIGN PATENT DOCUMENTS

| | | |
|---|---|---|
| CN | 110703739 A | 1/2020 |
| CN | 111052093 A | 4/2020 |

(Continued)

OTHER PUBLICATIONS

Office Action in Chinese Appln. No. 202210848221.9, mailed on Jun. 27, 2025, 27 pages (with English translation).

*Primary Examiner* — Zhen Y Wu
(74) *Attorney, Agent, or Firm* — Fish & Richardson P.C.

(57) ABSTRACT

Implementations of the present specification provide a vehicle fault processing method and apparatus, a device, and a medium. The method includes: determining a position of a target vehicle when fault detection of the target vehicle is triggered; sending a detection instruction to a target detection device corresponding to the target vehicle based on the position, wherein the target detection device is close to the position and capable of detecting the target vehicle; receiving fault information obtained by performing fault detection on the target vehicle through the detection device in response to the detection instruction; and performing fault processing on the target vehicle based on the fault information. In a case where a faulty vehicle is unable to perform fault communication, fault information of the faulty vehicle may be collected by a nearby target detection device, ensuring the fault processing of the vehicle in a communication fault state.

18 Claims, 6 Drawing Sheets

(56) References Cited

U.S. PATENT DOCUMENTS

| | | | | |
|---|---|---|---|---|
| 2018/0316763 A1* | 11/2018 | Wang | ................... | H04W 4/70 |
| 2019/0135231 A1* | 5/2019 | Sakuma | ................ | B60R 25/305 |
| 2019/0333291 A1* | 10/2019 | Liu | ..................... | G06F 16/00 |
| 2019/0340849 A1* | 11/2019 | Uchida | ............. | G05B 23/0221 |
| 2020/0074771 A1* | 3/2020 | Yang | ..................... | B60Q 1/52 |
| 2020/0082333 A1* | 3/2020 | Zhu | ........................ | G06F 21/34 |
| 2021/0192870 A1* | 6/2021 | Bergquist | ......... | B60W 50/0205 |
| 2023/0131387 A1* | 4/2023 | Salehi | ................. | G08G 1/205 |
| | | | | 701/23 |
| 2024/0169772 A1* | 5/2024 | Tanaka | ................ | G05B 19/042 |

FOREIGN PATENT DOCUMENTS

| | | | |
|---|---|---|---|
| CN | 111354193 A | 6/2020 |
| CN | 111684446 A | 9/2020 |
| CN | 113837127 A | 12/2021 |
| CN | 114724272 A | 7/2022 |
| JP | 2004220197 A | 8/2004 |

\* cited by examiner

VEHICLE FAULT PROCESSING METHOD AND APPARATUS, SERVER, DEVICE, AND MEDIUM

CROSS-REFERENCE TO RELATED APPLICATION

This application claims the benefit under 35 U.S.C. § 119(a) of the filing date of Chinese Patent Application No. 202210848221.9, filed in the Chinese Patent Office on Jul. 19, 2022. The disclosure of the foregoing application is herein incorporated by reference in its entirety.

TECHNICAL FIELD

Implementations in this specification relate to the field of vehicle fault processing, and specifically relate to a vehicle fault processing method and apparatus, a server, a device, and a medium.

BACKGROUND

Autonomous vehicles (self-driving automobiles), also known as driverless cars, computer-driven cars, or wheeled mobile robots, are intelligent cars that realize unmanned driving through computer systems. The autonomous vehicles have a history of decades in the 20th century, and have shown a trend towards practicality in the early 21st century. The autonomous vehicles rely on cooperation of artificial intelligence, visual computing, radar, monitoring device and global positioning system, so that computers can automatically and safely operate motor vehicles without any human active operation.

In a related art, the autonomous vehicle reports vehicle information in real time during driving, so that a remote server can learn about status of the vehicle. When the vehicle breaks down, the vehicle automatically reports fault information to a remote processor, and the remote processor performs fault processing according to the fault information reported by the vehicle, for example, performing control on the vehicle, helping call rescue, etc. However, in some cases, when the vehicle is in a faulty state, a communication fault may be contained in the fault state, and the fault information cannot be reported and a remote server is unable to timely obtain the fault information of the vehicle, resulting in delayed fault processing and even causing further potential safety hazards and traffic congestion.

SUMMARY

In view of this, multiple implementations in the specification are dedicated to providing a vehicle fault processing method and apparatus, a server, a device, and a medium. In a case that a faulty vehicle is unable to perform fault communication, fault information of the faulty vehicle may be collected by a nearby target detection device, ensuring fault processing of the vehicle in a communication fault state.

An implementation of the specification provides a vehicle fault processing method, and the method includes: determining a position of a target vehicle when fault detection of the target vehicle is triggered; sending a detection instruction to a target detection device corresponding to the target vehicle based on the position, where the target detection device is a detection device that is close to the position and capable of detecting the target vehicle in a plurality of detection devices; receiving fault information obtained by performing fault detection on the target vehicle through the detection device in response to the detection instruction; and performing fault processing on the target vehicle based on the fault information.

An implementation of the specification provides another vehicle fault processing method, and the method includes: determining a position of a target vehicle when fault detection of the target vehicle is triggered; sending a detection instruction to a target detection device corresponding to the target vehicle based on the position, where the target detection device is a detection device that is close to the position and capable of detecting the target vehicle in a plurality of detection devices; receiving fault information obtained by performing fault detection on the target vehicle through the detection device in response to the detection instruction; and sending the fault information to a data processing center, where the fault information is used for fault processing performed on the target vehicle by the data processing center.

An implementation of the specification provides still another vehicle fault processing method, and the method includes: receiving fault information obtained by performing fault detection on a target vehicle, where the fault information is obtained by an edge server through following steps including: determining, when the fault detection of the target vehicle is triggered, a position of the target vehicle, sending a detection instruction to a target detection device corresponding to the target vehicle based on the position, and receiving the fault information obtained by performing the fault detection on the target vehicle through the detection device in response to the detection instruction, where the target detection device is a detection device that is close to the position and capable of detecting the target vehicle in a plurality of detection devices; and performing fault processing on the target vehicle based on the fault information.

An implementation of the specification provides a vehicle fault processing apparatus, which includes: a first triggering module, configured to determine a position of a target vehicle when fault detection of the target vehicle is triggered; a first controlling module, configured to send a detection instruction to a target detection device corresponding to the target vehicle based on the position, where the target detection device is a detection device that is close to the position and capable of detecting the target vehicle in a plurality of detection devices; a first receiving module, configured to receive fault information obtained by performing fault detection on the target vehicle through the detection device in response to the detection instruction; and a processing module, configured to perform fault processing on the target vehicle based on the fault information.

An implementation of the specification provides an edge server for vehicle fault processing, which includes: a second triggering module, configured to determine a position of a target vehicle when fault detection of the target vehicle is triggered; a second controlling module, configured to send a detection instruction to a target detection device corresponding to the target vehicle based on the position, where the target detection device is a detection device that is close to the position and capable of detecting the target vehicle in a plurality of detection devices; a second receiving module, configured to receive fault information obtained by performing fault detection on the target vehicle through the detection device in response to the detection instruction; and a sending module, configured to send the fault information to a data processing center, where the fault information is used for fault processing performed on the target vehicle by the data processing center.

An implementation of the specification provides a data processing center for vehicle fault processing, which includes: a third receiving module, configured to receive fault information obtained by performing fault detection on a target vehicle, where the fault information is obtained by an edge server through following steps including: determining, when the fault detection of the target vehicle is triggered, a position of the target vehicle, sending a detection instruction to a target detection device corresponding to the target vehicle based on the position, and receiving the fault information obtained by performing the fault detection on the target vehicle through the detection device in response to the detection instruction, where the target detection device is a detection device that is close to the position and capable of detecting the target vehicle in a plurality of detection devices; and a second processing module, configured to perform fault processing on the target vehicle based on the fault information.

An implementation of the specification provides a computer device, which includes a memory, and one or more processors in communication with the memory; where the memory is configured to store instructions executable by the one or more processors, and the one or more processors are configured to perform the instructions to implement the method according to any one of the implementations described above.

An implementation of the specification provides a computer storage medium, and the computer storage medium is configured to store a program, where when the program is running, a device where the computer storage medium is located is controlled to execute the method according to any one of the implementations described above.

According to implementations provided in the specification, a position of a target vehicle is determined when fault detection of the target vehicle is triggered; a detection instruction is sent to a target detection device corresponding to the target vehicle based on the position, where the target detection device is a detection device that is close to the position and capable of detecting the target vehicle in a plurality of detection devices; fault information obtained by performing fault detection on the target vehicle through the detection device in response to the detection instruction is received; and fault processing is performed on the target vehicle based on the fault information. It may be realized to actively control the target detection device to perform the fault detection on the target vehicle and collect fault information of the target vehicle, in a case that the target vehicle triggers the fault detection. A scope of fault processing for autonomous vehicles is expanded and processing efficiency of vehicle fault is improved. Problems of untimely fault processing and expansion of impact caused by the target vehicle being unable to communicate in a case of failure may be avoided.

BRIEF DESCRIPTION OF THE DRAWINGS

In order to more clearly describe technical solutions in implementations of the present specification, the accompanying drawings that need to be used in the description of the implementations are briefly described below. Apparently, the accompanying drawings in the following description are only some implementations of the present invention. For a person of ordinary skill in the art, other drawings may be obtained based on these accompanying drawings without creative efforts.

DETAILED DESCRIPTION OF THE EMBODIMENTS

Overview

Figure 1:
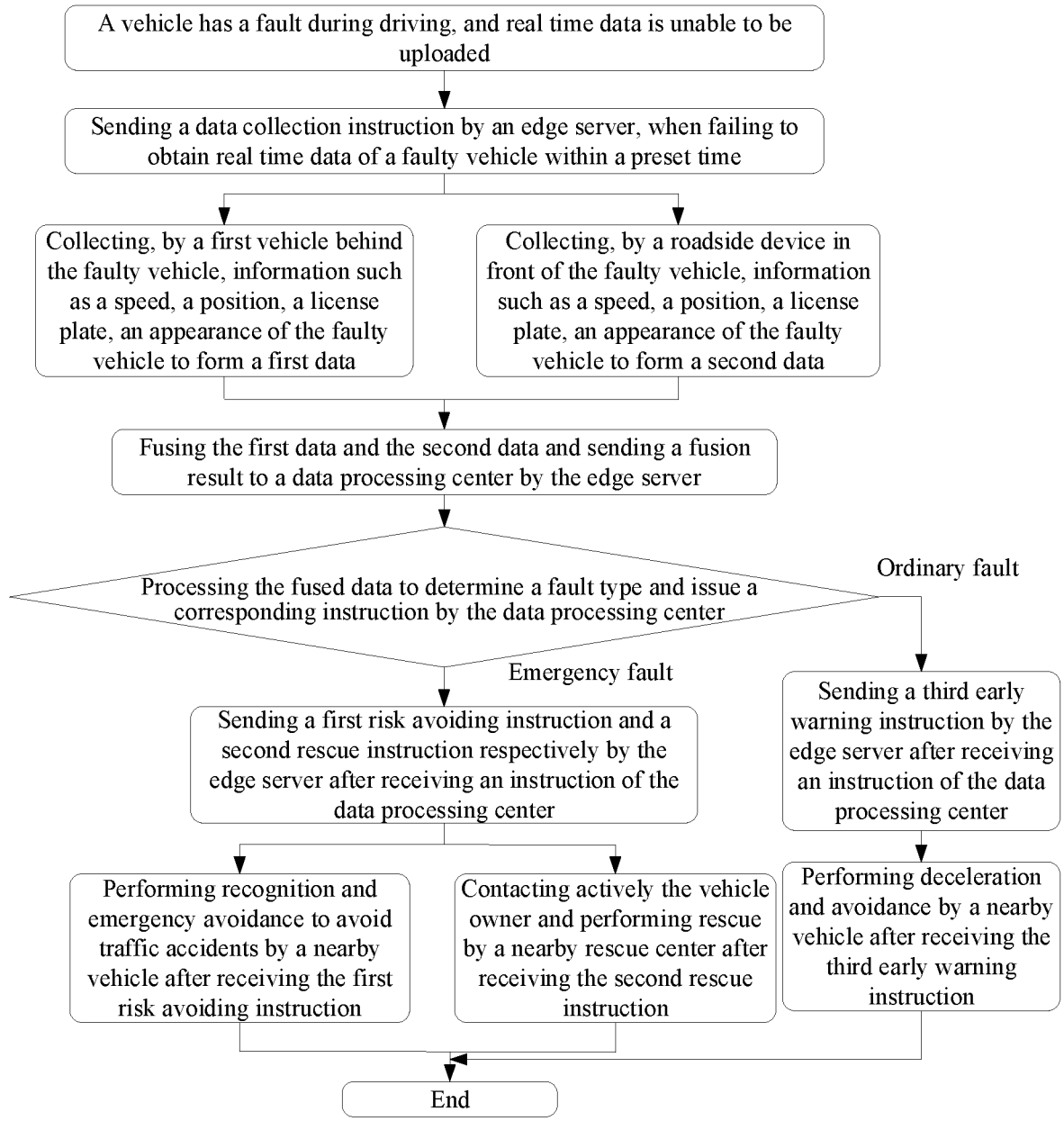
FIG. 1 is a schematic flowchart of a vehicle fault detection and judgment method according to an implementation in the present specification.

In related technologies, a target vehicle of autonomous driving is equipped with multiple sensors to sense environmental information and report it in real time to a data processing center. The data processing center is essentially a server that can execute tasks according to operation programs. The data processing center receives information reported by the target vehicle in real time as a basis for controlling the target vehicle. The reported information may include the target vehicle's own information, speed, acceleration, position, and the like. It may also include environmental information sensed by the target vehicle, including an environmental image, an obstacle distance, and the like.

It should be noted that when a vehicle reports information to the data processing center, there is a problem of unstable communication because the data processing center is far away. Therefore, edge servers may be set up along a road where the vehicle is traveling, so that the vehicle may send report information to the data processing center through forwarding of the edge servers.

When a target vehicle is in a situation of failure, vehicle information and environmental information may be collected, and the collected information may include fault information related to the fault. The collected information is sent as report information to the data processing center, which may preform processing and analyzing on the collected information to determine a specific fault type, or a fault level, etc. of the target vehicle. The data processing center may further perform a fault response according to the determined fault type or fault level, including notifying a vehicle near the target vehicle for early warning and avoidance, as well as notifying a rescue center for rescue.

When the fault of the target vehicle includes a communication fault, fault information of the target vehicle may not be uploaded to the data processing center in time. The data processing center is unable to effectively detect and process the fault situation of the target vehicle, so that the vehicle near the target vehicle is unable to timely and effectively determine that the target vehicle has a fault and make an emergency avoidance. Furthermore, a rear-end accident may occur, causing huge losses to personal safety and property of a vehicle owner and a passenger.

For this problem, in embodiments of the present disclosure, when a vehicle is unable to upload information due to communication failure and an edge server is unable to obtain real-time information of the vehicle, a fault detection task of the edge server may be triggered automatically. A position of the target vehicle is automatically determined by the edge server, and a data collection instruction is issued to a nearby detection device based on the position. A possible fault and a fault level of the target vehicle may be determined, and fault information may be sent to several edge servers near the faulty vehicle. The edge servers may send information about the faulty vehicle to nearby vehicles. After receiving the information, nearby vehicles may slow down and avoid in advance to avoid traffic accidents. If the fault level is high, a rescue instruction may be directly issued to a nearby rescue center, so that the rescue center actively contacts the vehicle owner for performing rescue. Thus, in a case that fault detection is triggered by the target vehicle, a target detection device may be actively controlled to perform fault detection on the target vehicle and collect fault information of the target vehicle. A scope of fault processing for autonomous vehicles is expanded and processing efficiency of vehicle fault is improved.

Scenario Example

The specification provides an application scenario example of a fault vehicle monitoring and judging method and system based on vehicle-road collaboration.

In a case that when a fault of a target vehicle includes a communication fault, fault information of the target vehicle may not be uploaded to a data processing center in time, an edge server cannot obtain real-time information of the vehicle. If the edge server fails to obtain real-time information sent by the target vehicle within a preset time, a fault detection task of the edge server may be automatically triggered. A position or a position range of the target vehicle is automatically determined based on the last real-time information reported by the target vehicle, and based on the determined position or the position range, a data collection instruction is issued to a nearby target detection device, which performs information collection on the target vehicle. The target detection device may be a detection device with a working range that overlaps with the position or the position range mentioned above. It should be noted that, the detection device mentioned above may be a roadside device disposed on a road, for example, a camera, a tachometer, and the like. The detection device mentioned above may also be a vehicle near the target vehicle. The collected information mentioned above may include an image, a speed, a position, etc. of the target vehicle.

In this scenario example, the target detection device mentioned above may be a first vehicle behind the target vehicle and a roadside device in front of the target vehicle. Referring to FIG. 1, specifically, during implementation, first fault information is collected by a target roadside device, and second fault information is collected by the first vehicle behind the target vehicle. The first vehicle and the target roadside device respectively send data collected by themselves to the edge server, which fuses the first fault information and the second fault information and then sends a fused result to the data processing center.

The data processing center may determine a possible fault and a fault level of the target vehicle based on the information, of the target vehicle, collected by the target detection device. The data processing center may send a fault processing instruction corresponding to the fault level to several edge servers near the target vehicle, and then the several edge servers may send the fault processing instruction to an execution object. In a case that the fault level is an ordinary fault, the edge server may send a fault processing instruction for the target vehicle to a nearby vehicle. After receiving this message, the nearby vehicle may slow down and avoid in advance to avoid traffic accidents. In a case that the fault level is an emergency fault, it is indicated that the target vehicle has a serious fault and requires external rescue. In this case, the edge server may further send a rescue instruction directly to a nearby rescue center, so that the rescue center actively contacts the vehicle owner for performing rescue.

The above is only a scenario example provided in the specification and is not intended to limit the present invention. Any modification, equivalent replacement, etc. made within the spirit and principle of the present invention should be included in the protection scope of the present invention.

System Architecture

Figure 2:
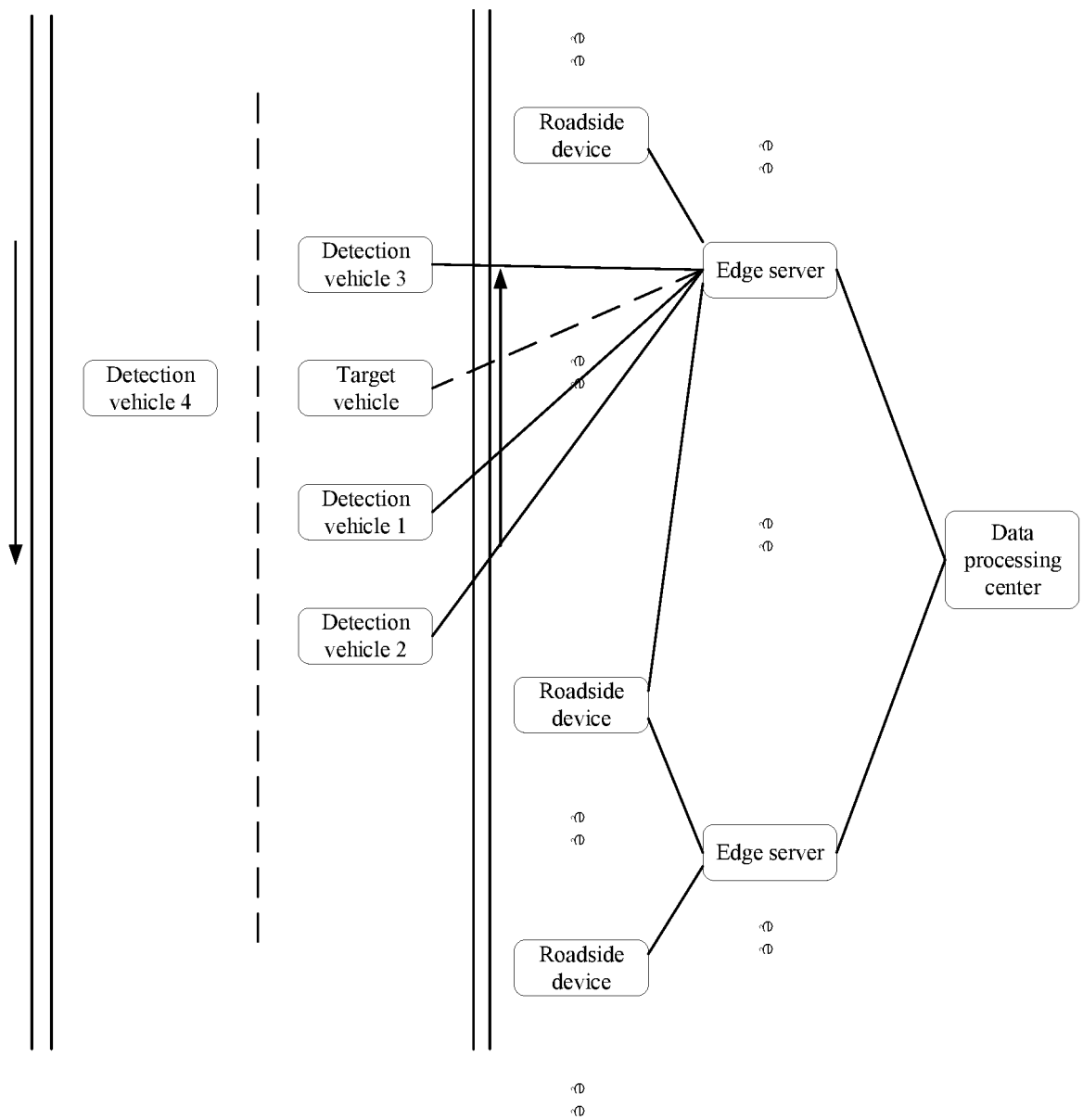
FIG. 2 is a schematic diagram of a vehicle fault detection and judgment system according to an implementation method in the present specification.

Implementations of the specification provide a vehicle-road collaborative fault vehicle monitoring system. Referring to FIG. 2, the system includes a vehicle having a data collection capability, a roadside device disposed on a driving road, an edge server, and a data processing center. The vehicle may be an autonomous vehicle, which may collect the vehicle's own information and environment information of the vehicle through a vehicle-mounted sensor or an acquisition device. The edge server mentioned above may be a server disposed near the road, or a server laid along the road according to a certain density. The edge server has a high communication strength with vehicles on the road, and has good stability. The edge server communicates with the remote data processing center, on one hand, the edge server forwards information sent by the roadside device or a vehicle to the data processing center, and on the other hand, the edge server forwards an instruction from the data processing center to the roadside device or a vehicle on the road.

The data processing center mentioned above may be a remote server, which may be an electronic device with certain computing and processing capabilities. It may have a network communication module, a processor, a memory, and the like. Certainly, the remote server may also refer to a software running in an electronic device. The remote server may also be a distributed server, which may be a system with multiple processors, memories, network communication modules, and the like to cooperatively operate. Alternatively, the remote server may also be a server cluster composed of several servers. Alternatively, with the development of science and technology, the remote server may also be a new technical means that can achieve corresponding functions of the implementations of the specification. For example, it may be a new form of "server" implemented based on quantum computing.

Referring to FIG. 2, in this system, the edge server can communicate with a detection vehicle 1 closely behind the target vehicle, a detection vehicle 2 closely behind the detection vehicle 1, a detection vehicle 3 in front of the target vehicle, and even a detection vehicle 4 in an opposite lane. When it is determined to perform fault information collection on the target vehicle, the detection vehicles 1, 2, 3, and 4 in FIG. 2 may be indicated to perform fault detection on the target vehicle, and of course, one or some of them may also be selected for indication, depending on a situation. In some cases, as shown in FIG. 2, the detection vehicles 1, 2, 3, and 4 are usually not satisfied at the same time, and therefore, a detection vehicle related to an actual situation of the target vehicle may be indicated to collect fault information of the target vehicle.

FIG. 2 shows roadside devices on a side of the target vehicle. It should be noted that the other side of the road where the target vehicle is located may also be provided with roadside devices, and the roadside devices may be arranged in a similar or identical manner. Moreover, the edge server may also be set on the other side of the road, and there is no fixed correspondence between the edge server and, the vehicles and the roadside devices communicated with the edge server. Therefore, the same vehicle or roadside device may use different edge servers in different data transmission processes. That is, the vehicle and the roadside device may also use the edge server on the other side of the road to communicate with the data processing center.

Exemplary Method

Figure 3:
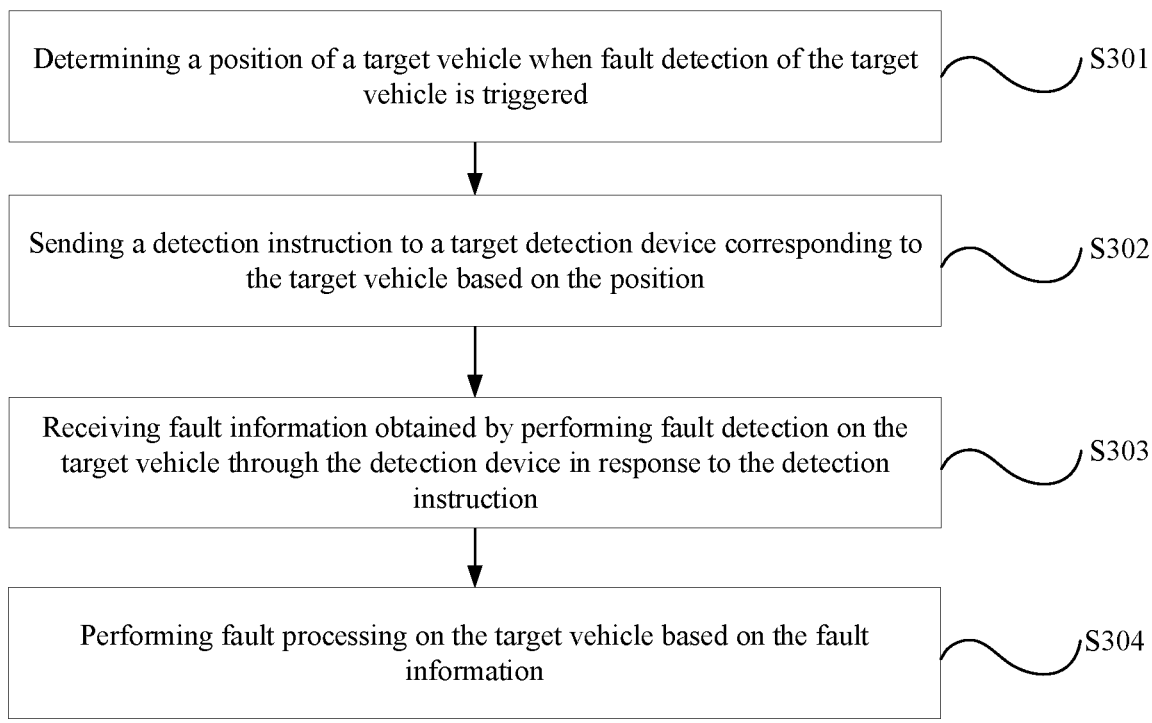
FIG. 3 is a schematic flowchart of a vehicle fault processing method according to an implementation in the present specification.

Referring to FIG. 3, an implementation of the specification provides a vehicle fault processing method. The vehicle fault processing method may be applied to a server. The vehicle fault processing method may include the following steps.

Step S301: determining a position of a target vehicle when fault detection of the target vehicle is triggered.

An execution subject of the above step is a server, and the server may perform data interaction with multiple vehicles including the target vehicle. A data interaction process includes obtaining information reported by a vehicle in real time and sending an instruction to the vehicle. The target vehicle mentioned above is an intelligent vehicle with a data acquisition function, or an autonomous vehicle. The target vehicle is capable of obtaining its own vehicle information and information of environment where the vehicle is located based on its own sensor, image acquisition device, etc. The target vehicle mentioned above collects information of its own and/or its environment in real time or in a regular time according to a certain rule. If the server fails to receive the information reported by the target vehicle within a preset time, the fault detection for the target vehicle may be automatically triggered.

The server mentioned above may be a specific server, or a server cluster composed of a plurality of servers, and the plurality of servers of the server cluster are configured to cooperate to provide services. For example, when the vehicle is an autonomous vehicle, the server mentioned above may include an edge server set near a road where the vehicle is located and a remote data processing center. The edge server is capable of receiving data from the vehicle. Since the edge server is located near the road, its signal strength is high and its data transmission stability is good, which is convenient for real-time data transmission. The edge server sends the received data to the data processing center.

After receiving the data, the data processing center performs fault analysis, and then sends a fault instruction to the edge server. The edge server sends the fault processing instruction sent by the data processing center to vehicles on the road. Therefore, the edge server and the data processing center form a server cluster, and a quantity of the edge server may be more than one. There may also be multiple data processing centers, and each data processing center may be responsible for a part of edge servers, which may improve processing efficiency of the data processing centers and reduce a load pressure of a single data processing center.

During determining the position of the target vehicle, a speed and a position of the target vehicle at a time of information reporting may be determined through information reported by the target vehicle, and an acceleration may further be combined to calculate a position or a position range of the target vehicle at a time after the reporting time.

In an optional implementation, before the determining a position of a target vehicle when fault detection of the target vehicle is triggered, the method further includes: triggering the fault detection of the target vehicle when a report signal sent by the target vehicle in real time is not received within a preset time, where the report signal is sent by the target vehicle in real time during driving.

When detecting the target vehicle, it is necessary to first determine the position of the target vehicle, and a detection device near the position may be remotely controlled to perform fault detection on the target vehicle by the server.

In an optional implementation, the determining a position of a target vehicle when fault detection of the target vehicle is triggered includes: obtaining a latest report signal sent by the target vehicle when the fault detection of the target vehicle is triggered; and determining the position of the target vehicle based on the latest report signal sent by the target vehicle, where the report signal includes a vehicle parameter of the target vehicle at a current time, and the vehicle parameter includes a position.

Specifically, when the vehicle parameter includes the position, a speed limit of a road where the target vehicle is located may be utilized to roughly determine a position range where the target vehicle is located. When the vehicle parameter further includes a speed or an acceleration, the speed or the acceleration of the vehicle may be combined with the position to determine a position range where the vehicle is possible located currently.

Step S302: sending a detection instruction to a target detection device corresponding to the target vehicle based on the position, where the target detection device is a detection device that is close to the position and capable of detecting the target vehicle in a plurality of detection devices.

The detection device mentioned above may be a roadside device or a vehicle in the same type as the target vehicle that is capable of collecting vehicle' own information and environmental information. The roadside device and an acquisition device on the vehicle may be traditional sensors or image acquisition devices, which usually have a normal working range, that is, a collection range. When determining the target detection device among multiple detection devices, it may be determined whether a collection range of a detection device overlaps with the position of the target vehicle. When there is an overlap, it is indicated that the detection device may perform effective information collection on the target vehicle, and the detection device may be identified as the target detection device. Therefore, it is ensured that the target detection device is capable of performing effective detection on the target vehicle.

In an optional implementation, the target detection device includes a target roadside device, and the sending a detection instruction to a target detection device corresponding to the target vehicle based on the position includes: determining the target roadside device corresponding to the position according to the position, where a road where the target vehicle is located is provided with a plurality of roadside devices, and the target roadside device is a roadside device that is capable of performing fault information collection on the target vehicle in the plurality of roadside devices; and sending the detection instruction to the target roadside device.

The target roadside device corresponding to the position is determined according to the position, and then, a detection instruction is sent to the target roadside device, which executes the detection instruction and performs information collection on the target vehicle to obtain first fault information. The first fault information is sent to the server after the target roadside device collects the first fault information. The server analyzes the first fault information, determines a fault type or a fault level, and then performs fault processing according to a corresponding fault processing process.

In an optional implementation, the target detection device further includes a detection vehicle near the target vehicle, and the sending a detection instruction to a target detection device corresponding to the target vehicle based on the position further includes: determining the detection vehicle corresponding to the position based on the position, where the detection vehicle is a vehicle that is capable of performing fault information collection on the target vehicle within a target area where the position is located; and sending the detection instruction to the detection vehicle.

The detection vehicle corresponding to the position is determined according to the position, and then, a detection instruction is sent to the detection vehicle, which executes the detection instruction and performs information collection on the target vehicle to obtain second fault information. The second fault information is sent to the server after the detection vehicle collects the second fault information. The server analyzes the second fault information, determines a fault type or a fault level, and then performs fault processing according to a corresponding fault processing process.

In an optional implementation, the receiving fault information obtained by performing fault detection on the target vehicle through the detection device in response to the detection instruction includes: receiving first fault information obtained by performing fault information collection on the target vehicle through the target roadside device in response to the detection instruction; receiving second fault information obtained by performing fault information collection on the target vehicle through the detection vehicle in response to the detection instruction; and determining the fault information based on the first fault information and the second fault information.

It should be noted that, in some cases, the target detection device mentioned above includes the target roadside device and the detection vehicle. After the first fault information and the second fault information are sent to the server, the server may first process the first fault information and the second fault information, including image recognition, data processing, and other processing methods. Then, the server may fuse the first fault information and the second fault information to obtain a fused data, that is, the fault information mentioned above. Fault analysis is performed based on the fused data to determine a fault level.

In some implementations, the first fault information and the second fault information may respectively include fault data of multiple different dimensions. For example, both the first fault information and the second fault information may include information such as an image, a speed, and a position of the target vehicle.

Based on the first fault information and the second fault information, both including the fault data of multiple different dimensions, the fault level of the target vehicle may be determined. For example, the first fault information and the second fault information may be comprehensively considered by a deep learning technology, so as to determine the fault level of the target vehicle. Specifically, the fault data of different dimensions may be vectorized and spliced in sequence to form a feature vector, and the feature vector is input into a deep neural network model to predict the fault level of the target vehicle.

Of course, in some implementations, for the fault data of different dimensions, fault scores representing a fault degree of the target vehicle may be calculated separately. Then, weighted calculation may be performed on the fault scores of different dimensions to obtain a final score. According to a value interval of the final score, the fault level of the target vehicle may be determined. In some implementations, fault data representing the same dimension in the first fault information and the second fault information may also be fused first and then fused with fault data of different dimensions. Specifically, for example, the first fault information may include an appearance image, a speed, and a vehicle position of the target vehicle. The second fault information may also include an appearance image of the target vehicle. After obtaining corresponding data, the data processing center may respectively recognize the appearance images of the target vehicle through an image recognition model to determine appearance damage scores. For the scores of the appearance images respectively corresponding to the first fault information and the second fault information, a weighted value may be obtained based on a preset weight. Next, the data processing center may calculate a weighted fault score based on the fault data of different dimensions according to preset weights corresponding to the fault data of different dimensions to obtain a final score. Moreover, according to a preset corresponding relationship between a final score and a fault level, the fault level of the target vehicle may be determined.

In some implementations, data collected by the same sensor, included in the first fault information and the second fault information, may include fault data of multiple dimensions. For example, images, included in the first fault information and the second fault information, of a vehicle may include fault data of multiple dimensions. The fault data may be data indicating a degree of damage to the vehicle, whether the vehicle's self-bring warning light is on, and other information. In some implementations, depending on different positions of the target vehicle, weights for the fusion of the first fault information and the second fault information may be different. Furthermore, weights corresponding to fault data representing different dimensions included in the first fault information and the second fault information may also be different. Specifically, for example, based on a distance between the target vehicle and the roadside device, as well as a distance between the target vehicle and a detection vehicle, weights corresponding to the first fault information and the second fault information may be determined. Of course, different roadside devices and different detection vehicles may also have different weights due to their different performance.

In a case that the server mentioned above includes the edge server and the data processing center, the edge server receives the first fault information and the second fault information, processes and fuses the first fault information and the second fault information to obtain fused data, and then sends the fused data to the data processing center for fault analysis.

Step S303: receiving fault information obtained by performing fault detection on the target vehicle through the detection device in response to the detection instruction.

The above step of receiving fault information obtained by performing fault detection on the target vehicle through the detection device in response to the detection instruction may be understood as receiving the fault information sent by the detection device, by the server. The fault information is obtained by the detection device responding to the detection instruction to perform the fault detection on the target vehicle. Data transmission between the edge server and the data processing center mentioned above may be regarded as internal data transmission within the server.

The fault information mentioned above may be image information obtained by performing image acquisition on the target vehicle, or may also be a speed, acceleration information, or position distance information, etc. obtained by locating the target vehicle through a sensing device using electromagnetic waves.

According to the image information, a vehicle damage condition of the target vehicle in an image may be recognized through image recognition, and a lighting condition of the target vehicle in the image may be recognized. A fault degree of the target vehicle may be identified through the vehicle damage condition. For example, if the vehicle body is damaged by less than 10%, the fault degree belongs to a mild damage, including normal use of the vehicle's main functions, the vehicle can drive normally, and a driver safety degree is high. If the vehicle body is damaged by 10%-30%, the fault degree belongs to a moderate damage, some functions of the vehicle are abnormal, the vehicle can barely drive, and a driver safety degree is low. If the vehicle body is damaged by 30%-60%, the fault degree belongs to a severe damage, the function of the vehicle is basically lost, the vehicle cannot continue to drive, and the driver has a certain mortality rate. If the vehicle body is damaged by more than 60%, the fault degree belongs to a complete damage, the function of the vehicle is completely lost, the vehicle has no possibility of driving, and the mortality rate of the driver is high.

A cause of the failure of the target vehicle may be identified by the lighting condition. For example, if the vehicle's light is double flashing light, it may be determined that the target vehicle is in a faulty state and the driver has turned on the double flashing of the vehicle. If the vehicle's light is on with a left turn signal and there is a collision with a straight vehicle, it may be determined that an accident may be caused during overtaking.

The sensing device mentioned above may include a speed sensor, a positioning sensor, and the like. By transmitting electromagnetic waves to the target vehicle and receiving echoes, a distance of the target vehicle is determined based on a time difference between the transmitted waves and echoes, and then a speed or a position of the target vehicle is determined through multiple distance detection. Furthermore, a driving status of the target vehicle may be determined, which may be used as a basis for determining whether the target vehicle has a fault.

For example, if the speed of the target vehicle has been decreased below a minimum speed limit for vehicles on road, it may be determined that a power system of the target vehicle may have a fault. If the position of the target vehicle is already outside a driving area of the road, it may be determined that the target vehicle has driven out of the road, and thus it may be determined that the target vehicle may have a fault related to direction control.

In an optional implementation, the fault information includes at least one of the following: an image of the target vehicle, a motion parameter, and a position parameter. The image mentioned above may be a grayscale image, an RGB image, an infrared image, an ultrasonic detection image, and the like. Those images may be collected by different types of image acquisition devices.

The motion parameter mentioned above may be speed data, acceleration data, average speed data, and the like. The speed data may be collected through a speed sensor and the motion parameter mentioned above may be obtained through processing and calculation of the speed data. The position parameter mentioned above may be a specific location point or a certain location area range.

The image, the motion parameter, and the position parameter mentioned above may all be used to evaluate the fault condition of the target vehicle, which further serve as a basis for determining whether the target vehicle is faulty or assessing the fault level when the target vehicle is determined to be faulty, so as to accurately and effectively determine whether the target vehicle is faulty.

Step S304: performing fault processing on the target vehicle based on the fault information.

Based on the fault information, a fault type or a fault level of the target vehicle may be determined, and then fault processing may be performed according to a specific fault type or fault level. For example, the fault type is a lighting fault, a method of fault processing may be to notify nearby vehicles to pay attention, slow down when in the vicinity of the target vehicle, or increase a range of obstacle detection to improve a speed and reaction efficiency of avoiding the target vehicle.

In an optional implementation, the performing fault processing on the target vehicle based on the fault information includes: determining vehicle information of the target vehicle based on an image of the fault information, where the vehicle information includes a vehicle damage condition and a vehicle light; determining speed information of the target vehicle based on the motion parameter; determining position information of the target vehicle based on the position parameter; determining a fault level of the vehicle based on the vehicle information, and/or the speed information, and/or the position information; and performing the fault processing on the target vehicle based on the fault level.

The vehicle damage and the vehicle light are determined according to the image, the speed of the target vehicle is determined according to the motion parameter, the position of the target vehicle is determined according to the position parameter, the fault level of the vehicle is comprehensively evaluated in combination with the vehicle damage condition, the vehicle light, the vehicle speed, and the position, and the fault processing is performed on the target vehicle based on a specific fault level. Therefore, a situation where all fault processing mechanisms for each fault may be triggered as different fault levels have different requirements for fault processing, which can easily lead to resource waste, may be avoided.

In an optional implementation, the performing the fault processing on the target vehicle based on the fault level includes: determining a fault processing instruction corresponding to the fault level based on the fault level, where the fault level is one of a plurality of fault levels, and each of the plurality of fault levels corresponds to at least one fault processing instruction; and sending the fault processing instruction to an execution object corresponding to the fault processing instruction, where the execution object is configured to execute the fault processing instruction and handle a fault situation caused by the target vehicle.

Specifically, in an optional implementation, the plurality of fault levels include: an emergency fault and an ordinary fault; the fault processing instruction includes at least one of a risk avoiding instruction, a rescue instruction, and an early warning instruction; the execution object includes a nearby vehicle and a rescue center, where the nearby vehicle is a vehicle within a predetermined range near the target vehicle; when the fault level is the emergency fault, the fault processing instruction corresponding to the fault level is determined to be the risk avoiding instruction and the rescue instruction; and the sending the fault processing instruction to an execution object corresponding to the fault processing instruction includes: sending the risk avoiding instruction to the nearby vehicle, and sending the rescue instruction to the rescue center.

In an optional implementation, the determining a fault processing instruction corresponding to the fault level based on the fault level further includes: when the fault level is the ordinary fault, determining the fault processing instruction corresponding to the fault level to be the early warning instruction; and the sending the fault processing instruction to an execution object corresponding to the fault processing instruction further includes: sending the early warning instruction to the nearby vehicle.

When the target vehicle suddenly malfunctions while driving on the road, and the fault information cannot be uploaded to the edge server and the data processing center, if the edge server does not receive real-time data uploaded by the faulty target vehicle within a preset time period, it may send a data collection instruction to a first vehicle behind the target vehicle and the nearest roadside device ahead. The first vehicle behind the faulty target vehicle uploads perceived information data of the target vehicle (speed, position, vehicle image, license plate, etc.) to the edge server through a camera, a radar and other information acquisition device to form a first data. A camera and a radar of the roadside device may also collect information data of the target vehicle (speed, position, fault picture, license plate, etc.) and upload it to the edge server to form a second data. The edge server fuses the first data and the second data and uploads a fused result to the data processing center. The data processing center calculates a fused data to determine the fault type of the target vehicle.

If it is an emergency fault, the fault information, a first risk avoiding instruction, and a first rescue instruction may be sent to the edge server near the target vehicle. The edge server may then send the fault information and the first risk avoiding instruction of the target vehicle to nearby vehicles. Vehicles that receive the risk avoiding instruction may slow down and avoid in advance to avoid traffic accidents. At the same time, the edge server may send the fault information and the first rescue instruction of the target vehicle to a nearby rescue center. After receiving the information, the rescue center actively contacts the vehicle owner for fault confirmation and implements a rescue plan.

If it is an ordinary fault, the fault information and a third early warning instruction may be sent to the edge server. After receiving the instruction, the edge server may issue it to all nearby vehicles, reminding them to slow down and avoid to avoid traffic accidents.

According to a method of the implementations, a position of a target vehicle is determined when fault detection of the target vehicle is triggered; a detection instruction is sent to a target detection device corresponding to the target vehicle based on the position, where the target detection device is a detection device that is close to the position and capable of detecting the target vehicle in a plurality of detection devices; fault information obtained by performing fault detection on the target vehicle through the detection device in response to the detection instruction is received; and fault processing is performed on the target vehicle based on the fault information. It may be realized to actively control the target detection device to perform the fault detection on the target vehicle and collect fault information of the target vehicle, in a case that the target vehicle triggers the fault detection. A scope of fault processing for autonomous vehicles is expanded and processing efficiency of vehicle fault is improved. Problems of untimely fault processing and expansion of impact caused by the target vehicle being unable to communicate in a case of failure may be avoided.

Figure 4:
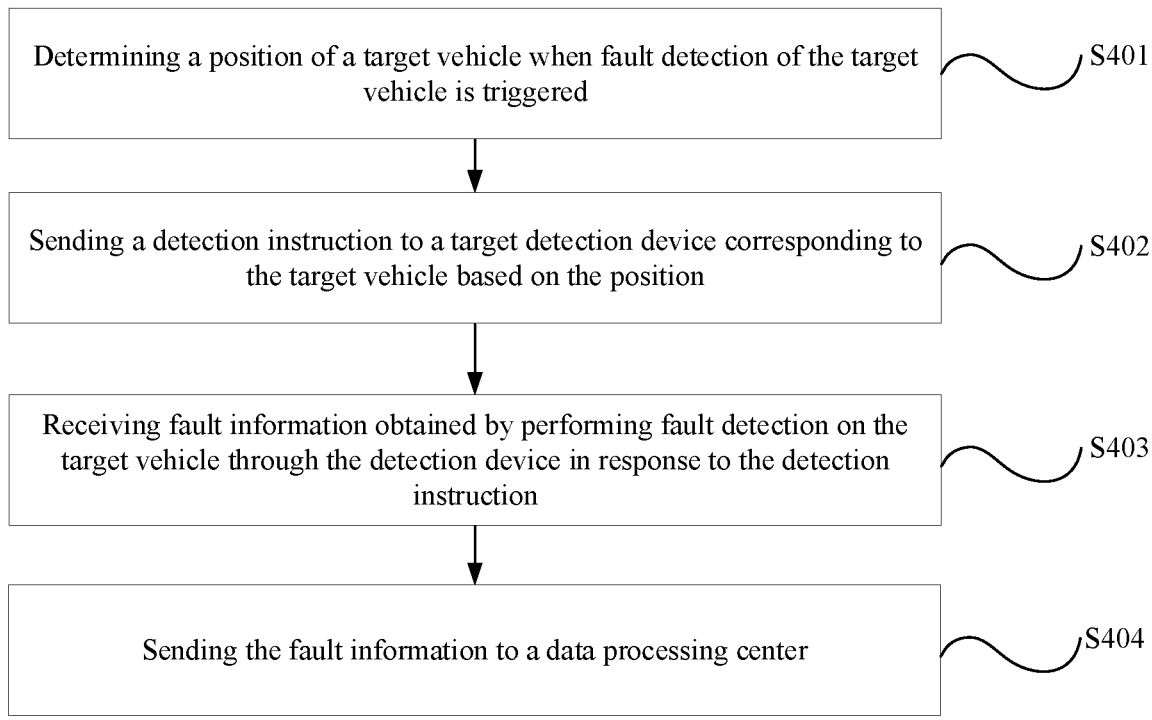
FIG. 4 is a schematic flowchart of another vehicle fault processing method according to an implementation in the present specification.

Referring to FIG. 4, an implementation of the specification provides another vehicle fault processing method. The vehicle fault processing method may be applied to an edge server. The vehicle fault processing method may include the following steps.

Step S401: determining a position of a target vehicle when fault detection of the target vehicle is triggered.

Step S402: sending a detection instruction to a target detection device corresponding to the target vehicle based on the position, where the target detection device is a detection device that is close to the position and capable of detecting the target vehicle in a plurality of detection devices.

Step S403: receiving fault information obtained by performing fault detection on the target vehicle through the detection device in response to the detection instruction.

Step S404: sending the fault information to a data processing center, where the fault information is used for fault processing performed on the target vehicle by the data processing center.

An execution subject of the above steps is the edge server. A position of a target vehicle is determined when fault detection of the target vehicle is triggered; a detection instruction is sent to a target detection device corresponding to the target vehicle based on the position, where the target detection device is a detection device that is close to the position and capable of detecting the target vehicle in a plurality of detection devices; fault information obtained by performing fault detection on the target vehicle through the detection device in response to the detection instruction is received; and the fault information is sent to a data processing center, where the fault information is used for fault processing performed on the target vehicle by the data processing center. It may be realized to actively control the target detection device to perform the fault detection on the target vehicle and collect fault information of the target vehicle, in a case that the target vehicle triggers the fault detection. A scope of fault processing for autonomous vehicles is expanded and processing efficiency of vehicle fault is improved. Problems of untimely fault processing and expansion of impact caused by the target vehicle being unable to communicate in a case of failure may be avoided.

As an optional implementation, after sending the fault information to the data processing center by the edge server, the method further includes: receiving a fault processing instruction, where the fault processing instruction is determined and sent by the data processing center based on a fault level; and sending the fault processing instruction to an execution object corresponding to the fault processing instruction.

Figure 5:
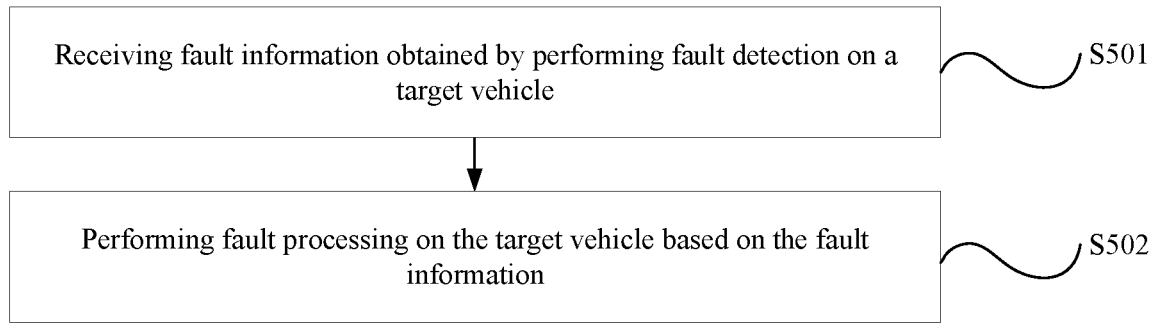
FIG. 5 is a schematic flowchart of another vehicle fault processing method according to an implementation in the present specification.

Referring to FIG. 5, an implementation of the specification provides another vehicle fault processing method. The vehicle fault processing method may be applied to a data processing center. The vehicle fault processing method may include the following steps.

Step S501: receiving fault information obtained by performing fault detection on a target vehicle, where the fault information is obtained by an edge server through following steps including: determining, when the fault detection of the target vehicle is triggered, a position of the target vehicle; sending a detection instruction to a target detection device corresponding to the target vehicle based on the position, and receiving the fault information obtained by performing the fault detection on the target vehicle through the detection device in response to the detection instruction; where the target detection device is a detection device that is close to the position and capable of detecting the target vehicle in a plurality of detection devices.

Step S502: performing fault processing on the target vehicle based on the fault information.

An execution subject of the above steps is a data processing center. Fault information obtained by performing fault detection on a target vehicle is received, where the fault information is obtained by an edge server through following steps including: determining, when the fault detection of the target vehicle is triggered, a position of the target vehicle; sending a detection instruction to a target detection device corresponding to the target vehicle based on the position; and receiving the fault information obtained by performing the fault detection on the target vehicle through the detection device in response to the detection instruction. The target detection device is a detection device that is close to the position and capable of detecting the target vehicle in a plurality of detection devices. Fault processing is performed on the target vehicle based on the fault information. It may be realized to actively control the target detection device to perform the fault detection on the target vehicle and collect fault information of the target vehicle, in a case that the target vehicle triggers the fault detection. A scope of fault processing for autonomous vehicles is expanded and processing efficiency of vehicle fault is improved. Problems of untimely fault processing and expansion of impact caused by the target vehicle being unable to communicate in a case of failure may be avoided.

As an optional implementation, the performing fault processing on the target vehicle based on the fault information by the data processing center includes: sending a fault processing instruction corresponding to a fault level to the edge server, where the edge server is configured to send the fault processing instruction to an execution object corresponding to the fault processing instruction.

The target vehicle and nearby vehicles should have a fully autonomous driving function or an auxiliary autonomous driving function. The vehicle is equipped with a wireless remote communication module and a high-precision positioning system, which is capable of uploading real-time information of the vehicle to the edge server and also receiving a corresponding instruction from the edge server. The real-time information of the vehicle includes but is not limited to a speed, a position, a license plate, lighting, vehicle model, a brake signal, an accelerator depth and other information.

The edge server should have an ability to receive data collected by a roadside unit and real-time data sent by a vehicle, and perform fusion processing on the collected data and then send a fused result to the data processing center. At the same time, it should have an ability to receive data and instructions from the data processing center, and send corresponding early warning instruction information to vehicles within a predetermined range nearby. The edge server is capable of sending a rescue instruction to a rescue center.

The roadside unit is used to monitor and collect information of a vehicle on the road, including a camera module and a radar module. It should be able to collect information of a vehicle on a preset road section, and the information includes but is not limited to a license plate, a vehicle body, a vehicle speed, a position, and other information. At the same time, it should have an ability to upload the collected vehicle information data to the edge server.

The rescue center should be able to receive an information instruction from the edge server and be able to perform a rescue task on a faulty vehicle.

The data processing center should be able to receive a fused data transmitted from the edge server, analyze the fused data according to a preset algorithm, and judge a fault level of the target vehicle. The fault level is divided into an emergency fault and an ordinary fault. The emergency level means that the target vehicle has already had a traffic accident, or a large potential danger is generated to surrounding vehicles and emergency rescue is urgently needed due to a major fault of the target vehicle. The ordinary level is defined as that the target vehicle has some faults and is disconnected from the edge server, but still able to continue normal driving, posing minor hazards to surrounding vehicles.

If the data processing center determines that the target vehicle is a vehicle of the emergency fault, the data processing center may issue a risk avoiding instruction and a rescue instruction to the edge server. The edge server sends the risk avoiding instruction to all vehicles near the target vehicle, and the rescue instruction is sent to a nearest rescue center. The risk avoiding instruction is mainly used to remind vehicles within a predetermined range of the target vehicle that the target vehicle has a major fault and all nearby vehicles must decelerate and avoid in advance to avoid traffic accidents. An emergency rescue instruction is configured to send possible fault information of the target vehicle to the nearest road rescue center, and the rescue center may actively contact the vehicle owner to confirm a specific situation of the fault and implement a rescue task.

If the data processing center determines that the target vehicle is a vehicle of the ordinary fault, the data processing center may issue an early warning instruction to the edge server. The edge server may send the early warning instruction to all nearby vehicles to remind the nearby vehicles that the target vehicle has certain faults and remind the nearby vehicles to pay attention to slow down and avoid.

Exemplary Apparatus

Figure 6:
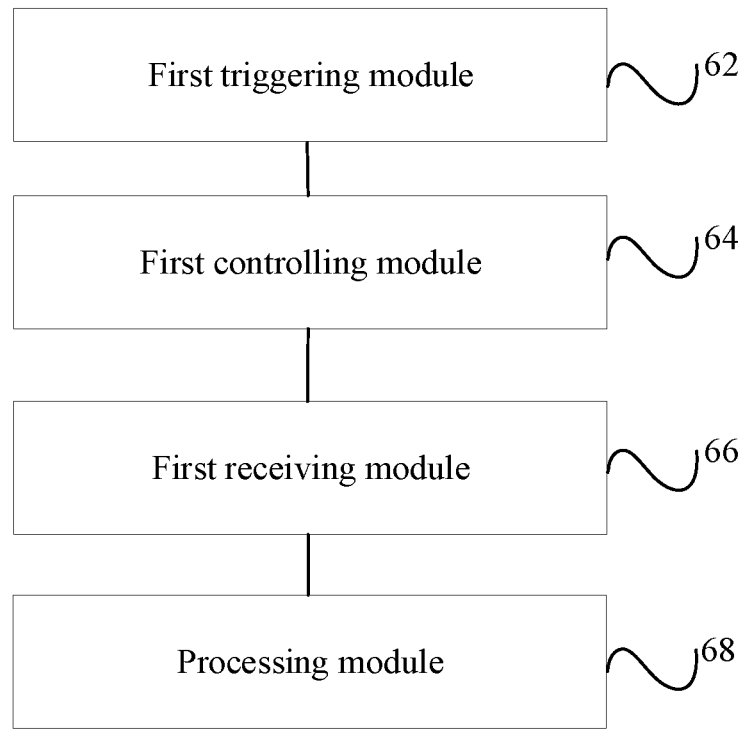
FIG. 6 is a schematic diagram of a vehicle fault processing apparatus according to an implementation in the present specification.

FIG. 6 is a schematic diagram of a vehicle fault processing apparatus according to an implementation in the present specification. As shown in FIG. 6, an implementation of the specification provides a vehicle fault processing apparatus. The apparatus may include first triggering module 62, a first controlling module 64, a first receiving module 66, and a processing module 68. The apparatus is described in detail below.

The first triggering module 62 is configured to determine a position of a target vehicle when fault detection of the target vehicle is triggered; the first controlling module 64, connected to the first triggering module 62, is configured to send a detection instruction to a target detection device corresponding to the target vehicle based on the position, where the target detection device is a detection device that is close to the position and capable of detecting the target vehicle in a plurality of detection devices; the first receiving module 66, connected to the first controlling module 64, is configured to receive fault information obtained by performing fault detection on the target vehicle through the detection device in response to the detection instruction; and the processing module 68, connected to the first receiving module 66, is configured to perform fault processing on the target vehicle based on the fault information.

According to the apparatus mentioned above, a position of a target vehicle is determined when fault detection of the target vehicle is triggered; a detection instruction is sent to a target detection device corresponding to the target vehicle based on the position, where the target detection device is a detection device that is close to the position and capable of detecting the target vehicle in a plurality of detection devices; fault information obtained by performing fault detection on the target vehicle through the detection device in response to the detection instruction is received; and fault processing is performed on the target vehicle based on the fault information. It may be realized to actively control the target detection device to perform the fault detection on the target vehicle and collect fault information of the target vehicle, in a case that the target vehicle triggers the fault detection. A scope of fault processing for autonomous vehicles is expanded and processing efficiency of vehicle fault is improved. Problems of untimely fault processing and expansion of impact caused by the target vehicle being unable to communicate in a case of failure may be avoided.

As an optional implementation, the target detection device includes a target roadside device, and the first controlling module includes: a first determining unit configured to determine the target roadside device corresponding to the position according to the position, where a road where the target vehicle is located is provided with a plurality of roadside devices, and the target roadside device is a roadside device that is capable of performing fault information collection on the target vehicle in the plurality of roadside devices; and a first sending unit configured to send the detection instruction to the target roadside device.

As an optional implementation, the target detection device further includes a detection vehicle near the target vehicle, and the first controlling module further includes: a second determining unit configured to determine the detection vehicle corresponding to the position based on the position, where the detection vehicle is a vehicle that is capable of performing fault information collection on the target vehicle within a target area where the position is located; and a second sending unit configured to send the detection instruction to the detection vehicle.

As an optional implementation, the first receiving module includes: a first receiving unit configured to receive first fault information obtained by performing fault information collection on the target vehicle through the target roadside device in response to the detection instruction; a second receiving unit configured to receive second fault information obtained by performing fault information collection on the target vehicle through the detection vehicle in response to the detection instruction; and a third determining unit configured to determine the fault information based on the first fault information and the second fault information.

As an optional implementation, the apparatus further includes a second triggering module configured to trigger the fault detection of the target vehicle when a report signal sent by the target vehicle in real time is not received within a preset time, where the report signal is sent by the target vehicle in real time during driving.

As an optional implementation, the first triggering module includes: an obtaining unit configured to obtain a latest report signal sent by the target vehicle when the fault detection of the target vehicle is triggered; and a positioning unit configured to determine the position of the target vehicle based on the latest report signal sent by the target vehicle, where the report signal includes a vehicle parameter of the target vehicle at a current time, and the vehicle parameter includes a position.

As an optional implementation, the fault information includes at least one of an image of the target vehicle, a motion parameter, and a position parameter.

As an optional implementation, the processing module includes: a fourth determining unit configured to determine vehicle information of the target vehicle based on an image of the fault information, where the vehicle information includes a vehicle damage condition and a vehicle light; a fifth determining unit configured to determine speed information of the target vehicle based on the motion parameter; a sixth determining unit configured to determine position information of the target vehicle based on the position parameter, and determine a fault level of the vehicle based on the vehicle information, and/or the speed information, and/or the position information; and a processing unit configured to perform the fault processing on the target vehicle based on the fault level.

As an optional implementation, the processing unit includes: a determining subunit configured to determine a fault processing instruction corresponding to the fault level based on the fault level, where the fault level is one of a plurality of fault levels, and each of the plurality of fault levels corresponds to at least one fault processing instruction; and a sending subunit configured to send the fault processing instruction to an execution object corresponding to the fault processing instruction, where the execution object is configured to execute the fault processing instruction and handle a fault situation caused by the target vehicle.

As an optional implementation, the plurality of fault levels include: an emergency fault and an ordinary fault; the fault processing instruction includes at least one of a risk avoiding instruction, a rescue instruction, and an early warning instruction; the execution object includes a nearby vehicle and a rescue center, where the nearby vehicle is a vehicle within a predetermined range near the target vehicle; the determining subunit includes: a first determining second-level subunit, configured to determine the fault processing instruction corresponding to the fault level to be the risk avoiding instruction and the rescue instruction when the fault level is the emergency fault; and the sending subunit includes: a first sending second-level subunit configured to send the risk avoiding instruction to the nearby vehicle, and send the rescue instruction to the rescue center.

As an optional implementation, the determining subunit further includes: a second determining second-level subunit configured to determine the fault processing instruction corresponding to the fault level to be the early warning instruction when the fault level is the ordinary fault; and the sending subunit further includes a second sending second-level subunit configured to send the early warning instruction to the nearby vehicle.

Exemplary Server

Figure 7:
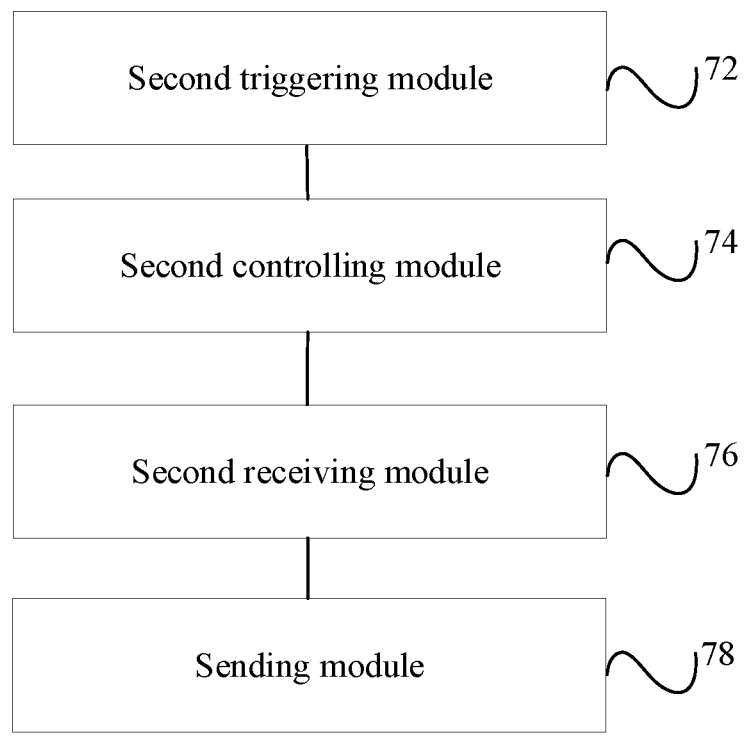
FIG. 7 is a schematic diagram of an edge server for vehicle fault processing according to an implementation in the present specification.

FIG. 7 is a schematic diagram of an edge server for vehicle fault processing according to an implementation in the present specification. As shown in FIG. 7, the implementations of the present invention also provide an edge server for vehicle fault processing, including: a second triggering module 72, a second controlling module 74, a second receiving module 76, and a sending module 78. The edge server is described in detail below.

The second triggering module 72 is configured to determine a position of a target vehicle when fault detection of the target vehicle is triggered; the second controlling module 74, connected to the second triggering module 72, is configured to send a detection instruction to a target detection device corresponding to the target vehicle based on the position, where the target detection device is a detection device that is close to the position and capable of detecting the target vehicle in a plurality of detection devices; the second receiving module 76, connected to the second controlling module 74, is configured to receive fault information obtained by performing fault detection on the target vehicle through the detection device in response to the detection instruction; the sending module 78, connected to the second receiving module 76, is configured to send the fault information to a data processing center, where the fault information is used for fault processing performed on the target vehicle by the data processing center.

According to the edge server mentioned above, a position of a target vehicle is determined when fault detection of the target vehicle is triggered; a detection instruction is sent to a target detection device corresponding to the target vehicle based on the position, where the target detection device is a detection device that is close to the position and capable of detecting the target vehicle in a plurality of detection devices; fault information obtained by performing fault detection on the target vehicle through the detection device in response to the detection instruction is received; and fault processing is performed on the target vehicle based on the fault information. It may be realized to actively control the target detection device to perform the fault detection on the target vehicle and collect fault information of the target vehicle, in a case that the target vehicle triggers the fault detection. A scope of fault processing for autonomous vehicles is expanded and processing efficiency of vehicle fault is improved. Problems of untimely fault processing and expansion of impact caused by the target vehicle being unable to communicate in a case of failure may be avoided.

As an optional implementation, the edge server further includes: a processing module configured to receive a fault processing instruction, where the fault processing instruction is determined and sent by the data processing center based on a fault level; and an executing module configured to send the fault processing instruction to an execution object corresponding to the fault processing instruction.

Exemplary Data Processing Center

Figure 8:
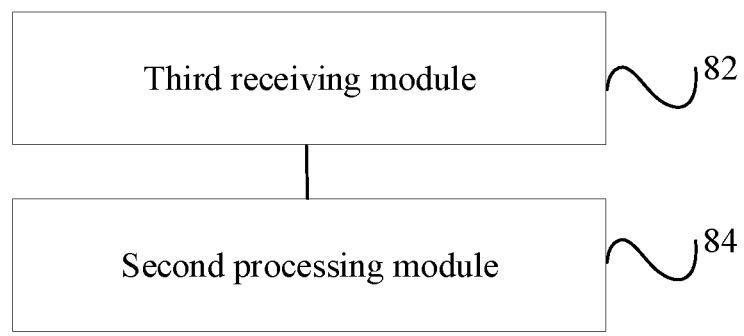
FIG. 8 is a schematic diagram of a data processing center for vehicle fault processing according to an implementation in the present specification.

FIG. 8 is a schematic diagram of a data processing center for vehicle fault processing according to an implementation in the present specification. As shown in FIG. 8, the implementations of the present invention also provide a data processing center for vehicle fault processing, including a third receiving module 82 and a second processing module 84. The data processing center is described in detail below.

The third receiving module 82, connected to the second processing module 84, is configured to receive fault information obtained by performing fault detection on a target vehicle, where the fault information is obtained by an edge server through following steps including: determining, when the fault detection of the target vehicle is triggered, a position of the target vehicle; sending a detection instruction to a target detection device corresponding to the target vehicle based on the position, and receiving the fault information obtained by performing the fault detection on the target vehicle through the detection device in response to the detection instruction. The target detection device is a detection device that is close to the position and capable of detecting the target vehicle in a plurality of detection devices. The second processing module 84 is configured to perform fault processing on the target vehicle based on the fault information.

According to the data processing center mentioned above, a position of a target vehicle is determined when fault detection of the target vehicle is triggered; a detection instruction is sent to a target detection device corresponding to the target vehicle based on the position, where the target detection device is a detection device that is close to the position and capable of detecting the target vehicle in a plurality of detection devices; fault information obtained by performing fault detection on the target vehicle through the detection device in response to the detection instruction is received; and fault processing is performed on the target vehicle based on the fault information. It may be realized to actively control the target detection device to perform the fault detection on the target vehicle and collect fault information of the target vehicle, in a case that the target vehicle triggers the fault detection. A scope of fault processing for autonomous vehicles is expanded and processing efficiency of vehicle fault is improved. Problems of untimely fault processing and expansion of impact caused by the target vehicle being unable to communicate in a case of failure may be avoided.

As an optional implementation, the second processing module of the data processing center includes a third sending unit configured to send a fault processing instruction corresponding to a fault level to the edge server, where the edge server is configured to send the fault processing instruction to an execution object corresponding to the fault processing instruction.

Exemplary Computer Device and Storage Medium

Figure 9:
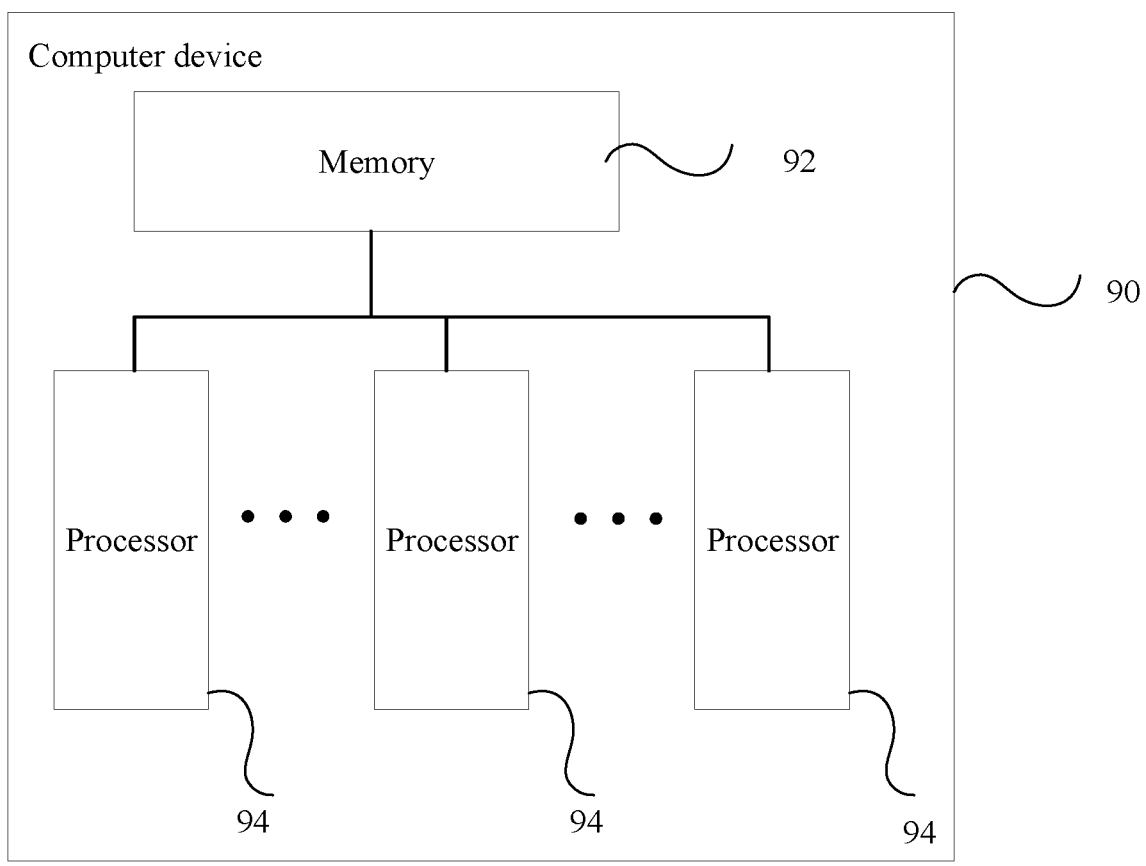
FIG. 9 is a schematic diagram of a computer device according to an implementation in the present specification.

FIG. 9 is a schematic diagram of a computer device according to an implementation in the present specification. As shown in FIG. 9, the implementations of this specification also provide a computer device 90. The computer device 90 may include: a memory 92, and one or more processors 94 in communication with the memory 92. The memory 92 is configured to store instructions executable by the one or more processors 94, and the one or more processors 94 are configured to perform the instructions to implement the method according to any one of the foregoing implementations.

The implementations of the specification also provide a computer-readable storage medium on which a computer program is stored. When the computer program is executed by a computer, the computer executes the vehicle fault processing method according to any one of the foregoing implementations.

The implementations of the specification also provide a computer program product that contains instructions. When the instructions are executed by a computer, the computer execute the vehicle fault processing method according to any one of the foregoing implementations.

It can be understood that the specific examples in this application are only intended to help those skilled in the art better understand the implementations of the specification, rather than limiting the scope of the present invention.

It can be understood that in the various implementations of the specification, a magnitude of a sequence number of each process does not mean an order of execution. The execution order of each process should be determined by its function and internal logic, and should not constitute any limitation on the implementation process of the implementations in the specification.

It can be understood that the various implementations described in the specification can be implemented separately or in combination, and the implementations in this specification are not limited to this.

Unless otherwise specified, all technical and scientific terms used in the implementations of this specification have the same meanings as those commonly understood by technical personnel in the technical field of this specification. The terms used in the specification are only for a purpose of describing specific implementations and are not intended to limit the scope of the specification. The term "and/or" used in the specification includes any and all combinations of one or more related listed items. Singular forms "a", "the above mentioned" and "the" used in the implementations of the specification and the appended claims are also intended to include a majority form, unless the context clearly indicates other meanings.

It can be understood that the processor in the implementations of the specification may be an integrated circuit chip with a signal processing capability. In an implementation process, each step of the above method implementations may be completed by an integrated logic circuit of hardware in a processor or an instruction in a form of software. The above-mentioned processor may be a general processor, a Digital Signal Processor (DSP), an Application Specific Integrated Circuit (ASIC), a Field Programmable Gate Array (FPGA), or other programmable logic devices, discrete gates or transistor logic devices, or discrete hardware components, which may implement or execute the methods, steps, and logical block diagrams disclosed in the implementations of the specification. The general processor may be a microprocessor, any conventional processor, or the like. The steps of the method disclosed in the implementations of the specification may be directly embodied as a hardware decoding processor for execution, or implemented by a combination of hardware and software modules in a decoding processor. The software module may be located in a mature storage medium in this field, such as a random access memory, a flash memory, a read-only memory, a programmable read-only memory, or an electrically erasable programmable memory, a register, etc. The storage medium is located in the memory, and the processor reads information in the memory and completes the steps of the above method in combination with hardware of the processor.

It can be understood that the memory in the implementations of the specification may be a volatile memory or a non-volatile memory, or may include both the volatile and the non-volatile memory. The non-volatile memory may be a Read-Only Memory (ROM), a Programmable Read-Only Memory (PROM), an Erasable Programmable Read-Only Memory (EPROM), an Electrically Erasable Programmable Read-Only Memory (EEPROM), or a flash memory. The volatile memory may be a Random Access Memory (RAM). It should be noted that the memory of the systems and methods described in this application is intended to include but not limited to these and any other suitable types of memory.

A person of ordinary skill in the art may realize that units and algorithm steps of examples described in combination with the disclosed implementations in this application can be implemented in electronic hardware, or a combination of computer software and electronic hardware. Whether these functions are executed in hardware or software depends on a specific application and a design constraint of a technical solution. Professional technicians may use different methods to implement the described functions for each specific application, but such implementation should not be considered beyond the scope of the specification.

Those skilled in the art may clearly understand that for the convenience and conciseness of the description, the specific working processes of the system, apparatus, and unit described above may refer to the corresponding processes in the aforementioned method implementations, and details are not repeated here.

In several implementations provided in the specification, it should be understood that the disclosed system, apparatus, and method can be implemented in other ways. For example, the apparatus implementations described above are only illustrative. For example, a division of the units is only a logical functional division, and there may be other division methods in actual implementation, for example, multiple units or components may be combined or integrated into another system, or some features may be ignored or not executed. On the other hand, the displayed or discussed mutual coupling or direct coupling or communication connection may be an indirect coupling or communication connection through some interfaces, apparatuses or units, which may be electrical, mechanical or other forms.

The units described as separate components may be or may not be physically separated, and the components displayed as units may be or may not be physical units, that is, they may be located in one place or distributed across multiple network units. Some or all of the units may be selected according to actual needs to achieve the purposes of the solutions of the implementations.

In addition, in various implementations of this specification, various functional units may be integrated into a single processing unit, or each unit may physically exist separately, or two or more units may be integrated into one unit.

If the function is implemented in a form of a software functional unit and sold or used as an independent product, the function may be stored in a computer-readable storage medium. Based on this understanding, the technical solutions of the specification may essentially be reflected in a form of a software product, or a part of the technical solutions contributing to an existing technology or a part of the technical solutions may essentially be reflected in a form of a software product, and the computer software product is stored in a storage medium, which includes several instructions to enable a computer device (which may be a personal computer, server, or network device, etc.) to perform all or part of the steps of the method described in each embodiment of this specification. The aforementioned storage medium includes: a U disk, a mobile hard disk, a Read-Only Memory (ROM), a Random Access Memory (RAM), a magnetic disc, an optical disc or other media that can store program codes.

The foregoing are only specific implementations of this specification, but the protection scope of this invention is not limited to this. Any technical personnel familiar with this technical field may easily conceive of changes or replacements within the technical scope disclosed in this specification, which should be covered within the protection scope of this specification. Therefore, the protection scope of the present invention shall be subject to the protection scope of claims.

What is claimed is:

1. A vehicle fault processing method, comprising:
   determining a position of a target vehicle when fault detection of the target vehicle is triggered;
   sending a detection instruction to a target detection device corresponding to the target vehicle based on the position, wherein the target detection device is a detection device of a plurality of detection devices that is close to the position and capable of detecting the target vehicle;
   receiving fault information obtained by performing fault detection on the target vehicle through the target detection device in response to the detection instruction, wherein the fault information comprises at least one of an image of the target vehicle, a motion parameter, and a position parameter; and
   causing to perform fault processing on the target vehicle based on the fault information, wherein the fault processing comprises:
      determining data including at least one of (i) vehicle information of the target vehicle based on the image of the fault, (ii) speed information of the target vehicle based on the motion parameter, and (iii) position information of the target vehicle based on the position parameter, wherein the vehicle information comprises at least one of a vehicle damage condition and a vehicle light,
      determining a fault level based on the determined data, and
      performing the fault processing on the target vehicle based on the fault level.

2. The method according to claim 1, wherein the target detection device comprises a target roadside device, and sending the detection instruction to the target detection device corresponding to the target vehicle based on the position comprises:
   determining the target roadside device corresponding to the position according to the position, wherein a road where the target vehicle is located is provided with a plurality of roadside devices, and the target roadside device is a roadside device that is capable of performing fault information collection on the target vehicle in the plurality of roadside devices; and
   sending the detection instruction to the target roadside device.

3. The method according to claim 2, wherein the target detection device further comprises a detection vehicle near the target vehicle, and sending the detection instruction to the target detection device corresponding to the target vehicle based on the position further comprises:
   determining the detection vehicle corresponding to the position based on the position, wherein the detection vehicle is a vehicle that is capable of performing fault information collection on the target vehicle within a target area where the position is located; and
   sending the detection instruction to the detection vehicle.

4. The method according to claim 3, wherein receiving the fault information obtained by performing the fault detection on the target vehicle through the target detection device in response to the detection instruction comprises:
   receiving first fault information obtained by performing fault information collection on the target vehicle through the target roadside device in response to the detection instruction;
   receiving second fault information obtained by performing fault information collection on the target vehicle through the detection vehicle in response to the detection instruction; and
   determining the fault information based on the first fault information and the second fault information.

5. The method according to claim 1, before determining the position of the target vehicle when the fault detection of the target vehicle is triggered, further comprising:
   triggering the fault detection of the target vehicle when a report signal sent by the target vehicle in real time is not received within a preset time, wherein the report signal is sent by the target vehicle in real time during driving.

6. The method according to claim 5, wherein determining the position of the target vehicle when the fault detection of the target vehicle is triggered comprises:
   obtaining a latest report signal sent by the target vehicle when the fault detection of the target vehicle is triggered; and
   determining the position of the target vehicle based on the latest report signal sent by the target vehicle, wherein the report signal comprises a vehicle parameter of the target vehicle at a current time, and the vehicle parameter comprises a position.

7. The method according to claim 1, wherein performing the fault processing on the target vehicle based on the fault level comprises:
   determining a fault processing instruction corresponding to the fault level based on the fault level, wherein the fault level is one of a plurality of fault levels, and each of the plurality of fault levels corresponds to at least one fault processing instruction; and
   sending the fault processing instruction to an execution object corresponding to the fault processing instruction, wherein the execution object is configured to execute the fault processing instruction and handle a fault situation caused by the target vehicle.

8. The method according to claim 7, wherein the plurality of fault levels comprise an emergency fault and an ordinary fault;
   wherein the fault processing instruction comprises at least one of a risk avoiding instruction, a rescue instruction, and an early warning instruction;
   wherein the execution object comprises a nearby vehicle and a rescue center, wherein the nearby vehicle is a vehicle within a predetermined range near the target vehicle;
   wherein when the fault level is the emergency fault, the fault processing instruction corresponding to the fault level is determined to be the risk avoiding instruction and the rescue instruction; and
   wherein the sending the fault processing instruction to an execution object corresponding to the fault processing instruction comprises:
   sending the risk avoiding instruction to the nearby vehicle, and sending the rescue instruction to the rescue center.

9. The method according to claim 8, wherein determining the fault processing instruction corresponding to the fault level based on the fault level further comprises:
   when the fault level is the ordinary fault, determining the fault processing instruction corresponding to the fault level to be the early warning instruction; and wherein sending the fault processing instruction to the execution object corresponding to the fault processing instruction further comprises:
  sending the early warning instruction to the nearby vehicle.

10. The method according to claim 1, further comprising:
sending the fault information to a data processing center, wherein the fault information is used for fault processing performed on the target vehicle by the data processing center.

11. The method according to claim 10, after sending the fault information to the data processing center, further comprising:
  receiving a fault processing instruction, wherein the fault processing instruction is determined and sent by the data processing center based on a fault level; and
  sending the fault processing instruction to an execution object corresponding to the fault processing instruction.

12. The method of claim 1,
wherein the fault information is obtained by an edge server.

13. The method according to claim 12, wherein causing to perform the fault processing on the target vehicle based on the fault information comprises:
  sending a fault processing instruction corresponding to a fault level to the edge server, wherein the edge server is configured to send the fault processing instruction to an execution object corresponding to the fault processing instruction.

14. A computer device, comprising:
a memory, and one or more processors in communication with the memory; wherein
the memory is configured to store instructions executable by the one or more processors, and the one or more processors are configured to perform the instructions to implement operations comprising:
determining a position of a target vehicle when fault detection of the target vehicle is triggered;
sending a detection instruction to a target detection device corresponding to the target vehicle based on the position, wherein the target detection device is a detection device of a plurality of detection devices that is close to the position and capable of detecting the target vehicle;
receiving fault information obtained by performing fault detection on the target vehicle through the target detection device in response to the detection instruction, wherein the fault information comprises at least one of an image of the target vehicle, a motion parameter, and a position parameter; and
causing to perform fault processing on the target vehicle based on the fault information, wherein the fault processing comprises:
  determining data including at least one of (i) vehicle information of the target vehicle based on the image of the fault, (ii) speed information of the target vehicle based on the motion parameter, and (iii) position information of the target vehicle based on the position parameter, wherein the vehicle information comprises at least one of a vehicle damage condition and a vehicle light,
  determining a fault level based on the determined data, and
  performing the fault processing on the target vehicle based on the fault level.

15. The computer device according to claim 14, wherein the target detection device comprises a target roadside device, and sending the detection instruction to the target detection device corresponding to the target vehicle based on the position comprises:
  determining the target roadside device corresponding to the position according to the position, wherein a road where the target vehicle is located is provided with a plurality of roadside devices, and the target roadside device is a roadside device that is capable of performing fault information collection on the target vehicle in the plurality of roadside devices; and
  sending the detection instruction to the target roadside device.

16. The computer device according to claim 15, wherein the target detection device further comprises a detection vehicle near the target vehicle, and sending the detection instruction to the target detection device corresponding to the target vehicle based on the position further comprises:
  determining the detection vehicle corresponding to the position based on the position, wherein the detection vehicle is a vehicle that is capable of performing fault information collection on the target vehicle within a target area where the position is located; and
  sending the detection instruction to the detection vehicle.

17. One or more non-transitory computer storage media, configured to store a program that, when the program is executed, causes a device including the one or more non-transitory computer storage media to perform operations comprising:
determining a position of a target vehicle when fault detection of the target vehicle is triggered;
sending a detection instruction to a target detection device corresponding to the target vehicle based on the position, wherein the target detection device is a detection device of a plurality of detection devices that is close to the position and capable of detecting the target vehicle;
receiving fault information obtained by performing fault detection on the target vehicle through the target detection device in response to the detection instruction, wherein the fault information comprises at least one of an image of the target vehicle, a motion parameter, and a position parameter; and
causing to perform fault processing on the target vehicle based on the fault information, wherein the fault processing comprises:
  determining data including at least one of (i) vehicle information of the target vehicle based on the image of the fault, (ii) speed information of the target vehicle based on the motion parameter, and (iii) position information of the target vehicle based on the position parameter, wherein the vehicle information comprises at least one of a vehicle damage condition and a vehicle light,
  determining a fault level based on the determined data, and
  performing the fault processing on the target vehicle based on the fault level.

18. The one or more non-transitory computer storage media according to claim 17, wherein the target detection device comprises a target roadside device, and sending the detection instruction to the target detection device corresponding to the target vehicle based on the position comprises:
  determining the target roadside device corresponding to the position according to the position, wherein a road where the target vehicle is located is provided with a plurality of roadside devices, and the target roadside device is a roadside device that is capable of performing fault information collection on the target vehicle in the plurality of roadside devices; and sending the detection instruction to the target roadside device.

* * * * *